(12) United States Patent
Lu

(10) Patent No.: US 12,149,152 B2
(45) Date of Patent: Nov. 19, 2024

(54) AXIAL FLUX MAGNET MOTOR STATOR ASSEMBLY, AN ASSEMBLING METHOD, AND A CEILING FAN

(71) Applicant: ZK Optoelectronics Technology (Zhongshan) Co., Ltd., Guangdong (CN)

(72) Inventor: Wei dian Lu, Zhongshan (CN)

(73) Assignee: ZK Optoelectronics Technology (Zhongshan) Co., Ltd., Zhongshan (CN)

(*) Notice: Subject to any disclaimer, the term of this patent is extended or adjusted under 35 U.S.C. 154(b) by 0 days.

(21) Appl. No.: 18/297,082

(22) Filed: Apr. 7, 2023

(65) Prior Publication Data

US 2024/0088749 A1    Mar. 14, 2024

(30) Foreign Application Priority Data

| Sep. 14, 2022 | (CN) | ............................ | 202211117797.4 |
| Sep. 16, 2022 | (CN) | ............................ | 202211131265.6 |
| Oct. 28, 2022 | (CN) | ............................ | 202211338795.8 |

(51) Int. Cl.

| H02K 1/18 | (2006.01) |
| F04D 19/00 | (2006.01) |
| F04D 25/08 | (2006.01) |
| F04D 29/056 | (2006.01) |
| H02K 7/08 | (2006.01) |
| H02K 7/14 | (2006.01) |
| H02K 15/06 | (2006.01) |

(52) U.S. Cl.
CPC ............. *H02K 7/14* (2013.01); *F04D 19/002* (2013.01); *F04D 25/088* (2013.01); *F04D 29/056* (2013.01); *H02K 1/18* (2013.01); *H02K 7/085* (2013.01); *H02K 15/065* (2013.01)

(58) Field of Classification Search
CPC ...... H02K 1/18; H02K 15/065; F04D 25/008; F04D 19/002
See application file for complete search history.

(56) References Cited

U.S. PATENT DOCUMENTS

| 8,421,301 | B2 * | 4/2013 | Hsu | ........................ | H02K 1/182 |
| | | | | | 310/216.118 |
| 9,577,478 | B2 * | 2/2017 | Post | ........................ | H02K 5/24 |

* cited by examiner

*Primary Examiner* — Michael L Sehn
(74) *Attorney, Agent, or Firm* — Best & Flanagan LLP

(57) ABSTRACT

The present invention discloses an axial flux magnet motor stator assembly, an assembling method, and a ceiling fan, wherein a coil winding assembly can be prefabricated, then assembled on a stator winding column without the need to reserve a large avoidance space between two adjacent stator winding columns, accordingly the gap between them can be minimized, for which each of them can have a maximum number of turns of the coil winding assembly to enhance the magnetic flux, further improve the output power and torque, provide an assembly efficiency and reduce the manufacturing cost. The terminals of each coil winding assembly are located in the bottom cover filling slot and fixed by an adhesive to ensure that the electrical connection is reliable and stable. Thus, a ceiling fan of the present invention using the above assembly has the characteristics of large output power and torque under the same size.

13 Claims, 19 Drawing Sheets

AXIAL FLUX MAGNET MOTOR STATOR ASSEMBLY, AN ASSEMBLING METHOD, AND A CEILING FAN

FIELD OF THE INVENTION

The present invention relates to the field of ceiling fans, more particularly, an axial flux magnet motor stator assembly, an assembling method, and a ceiling fan.

BACKGROUND OF THE INVENTION

As an electric appliance that performs air circulation, ventilation and cooling, the ceiling fan is widely used in industrial plants, logistics warehouses, waiting rooms, exhibition halls, stadiums, supermarkets, etc. In the existing technology, the ceiling fan blade and the motor are usually connected by a blade iron, in which one end is a relatively fixed connection on the surface of the fan blade. In order to reduce the manufacturing cost of the fan blade and reduce the weight of the fan blade, the fan blade is usually designed to be thin, and it results in fatigue damage to the position of the surface connection of the blade iron and fan blade, and since the thinner fan blade has low rigidity, the fan blade easily vibrates during the rotation, further accelerating the fatigue on the connection between the blade iron and fan blade, so there exist unsafe factors such as unreliable connection.

In addition, in the prior art, ceiling fans using axial flux magnet motor, the end of the stator winding column on the stator ring is usually provided with a holding part, when winding with an automatic winding machine, for avoiding interference, it is usually necessary to design to ensure that there has sufficient avoidance space in the stator holding slot between the adjacent two stator winding columns. For this reason, when the stator assembly size is certain, the number of turns on the winding column will inevitably be smaller by using the above design, which will affect the volume of the magnetic flux, which in turn will affect the output power and torque of the motor, and ultimately affect the use of the ceiling fan effect. To ensure the output power and torque of the motor, it will be necessary to design a larger stator ring, but this will lead to an increase in the overall volume and weight of the axial flux magnet motor and also the manufacturing costs.

In addition, the stator shaft of the ceiling fan in the prior art usually uses a snap ring for limiting, which is easily damaged by fatigue due to the snap ring supporting the stator assembly for a long period, so the prior art contains the problems of unstable and unsafe connection issues.

Furthermore, in the prior art, the stator shaft usually uses a ball bearing to rotatably connect to a rotor disk, due to its own gravity, the rotor assembly and the fan blade will produce a downward force along the axial direction. Since the ball bearing cannot withstand the axial force, it will be easy to cause damage to the ball bearing under such force for a long period, resulting in unstable operation of the ceiling fan.

For this reason, the present invention is proposed in response to the above problems.

SUMMARY OF THE INVENTION

In response to the above technical problems, the present invention provides an axial flux magnet motor stator assembly, an assembling method, and a ceiling fan, which can improve the problems existing in the prior art, with high efficiency, stable and reliable connection structure, as well as smooth and safe operation.

The present invention is an axial flux magnet motor stator assembly including a stator ring in the shape of a circle, a stator bottom cover with a coil winding assembly connected to the stator ring with terminals, the stator ring having stator winding columns extending in the axial direction uniformly in the circumferential direction, a stator holding slot formed between two adjacent stator winding columns, the stator holding slot being provided with openings on both sides in the radial direction, the stator holding slot being a vertical plane on the opposite sides. The coil winding assembly includes a coil body and a coil hole provided on the coil body, and the prefabricated coil winding assembly is connected to the stator winding column through the coil hole; the bottom of the stator ring directly or indirectly contacts the inner bottom of the stator bottom cover, and the stator bottom cover includes a bottom cover outer ring and a bottom cover inner ring located on the inner side of the bottom cover outer ring; and a bottom cover installation groove is formed between the outer ring and the inner ring of the bottom cover for installing the stator ring, and a bottom cover filling slot is formed between the stator ring and the inner ring of the bottom cover, the terminals of each coil winding assembly are located in the bottom cover filling slots and fixed by an adhesive. With this solution, the coil winding assembly can be prefabricated, then assembled on the stator winding columns without the need to reserve a large avoidance space in the stator holding slot between two adjacent stator winding columns, and accordingly, the gap between two adjacent coil winding assemblies is minimized, so that each stator winding column can have the maximum number of turns of the coil winding assembly to enhance the magnetic flux and further improve the output power and torque of the magnet motor and effectively reduce the manufacturing cost. In addition, since the terminals of each coil winding assembly located in the bottom cover filling slots are fixed by the adhesive, it has ensured the reliable and stable electrical connection of each coil winding assembly.

The present invention also provides an assembling method using the above-mentioned axial flux magnet motor stator assembly, which improves production efficiency by prefabricating the coil winding assembly and then assembling them to the stator winding columns without the need to directly wind them on the stator ring, crucially minimizing the gap between two adjacent coil winding assemblies so as to maximize the number of coils on each stator winding column and fixing the connected terminals in the bottom cover filling slot by the adhesive to ensure the reliable and stable electrical connection of each coil winding assembly.

The present invention further provides a ceiling fan using the above-mentioned axial flux magnet motor stator assembly, including a stator shaft relatively and fixedly connected to the stator assembly, a rotor assembly disposed above the stator assembly and rotatable relative to the stator shaft, and a number of fan blades circumferentially distributed on the rotor assembly, to constitute the axial flux magnet motor ceiling fan by the above-mentioned stator assembly and rotor assembly. Compared with the prior art, it includes the characteristics of small size and weight under the same output power and torque parameters, so that the axial flux magnet motor used in the present invention has the characteristics of large output power and torque under the same size. In addition, the ceiling fan uses a hollow structure, and each fan blade is relatively and fixedly connected to the fan blade by an inserting part of a fan blade connector inserted into the fan blade. Therefore, it has the characteristics of a reliable connection, safe and stable operation, and low inertia.

BRIEF DESCRIPTION OF THE DRAWINGS

The specific embodiments of the present invention are described in further detail below in conjunction with the accompanying drawings, in which.

DESCRIPTION OF THE PREFERRED EMBODIMENTS

Figure 1:
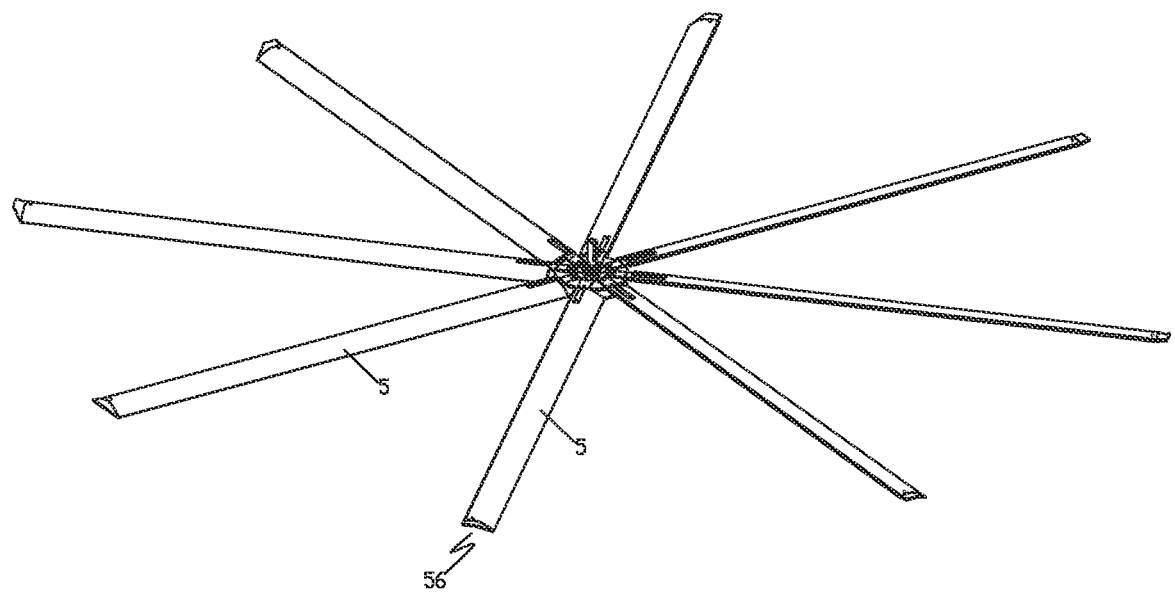
FIG. 1 is a schematic diagram of the three-dimensional structure of the ceiling fan of the present invention.

The embodiments of the present invention are described in detail below in conjunction with the accompanying FIGS. 1-19.

As shown in FIGS. 1-9, an axial flux magnet motor stator assembly of the present invention includes a stator ring 22 in the shape of a circle, a coil winding assembly 23 having terminals 233, and a stator bottom cover 21 matingly connected to the stator ring. The stator ring 22 has stator winding columns 221 extending along the axial direction uniformly in the circumferential direction, a stator holding slot 222 formed between two adjacent stator winding columns 221, the stator holding slot 222 being provided with openings on both sides in the radial direction, the stator holding slot 222 being a vertical plane on the opposite sides. The coil winding assembly 23 includes a coil body 231 and a coil hole 232 provided on the coil body 231 for connection with the stator winding column 221. In assembly, the coil winding assemblies are first prefabricated on an insulating sleeve 230, and then the finished prefabricated coil winding assemblies are tightly assembled on the stator winding columns. By using this structural design, the problem that the number of coils is affected by the need to reserve a large avoidance space for the stator holding slot in the prior art has been avoided, so that the gap between the coil winding assemblies on two adjacent stator winding columns can be minimized and the number of coils of the coil winding assemblies can be maximized under the same size, which effectively increases the magnetic flux and improves the output power and torque of the axial flux magnet motor, and ensures the minimization of the overall size of the axial flux magnet motor, which effectively reduces the manufacturing cost.

Figure 5:
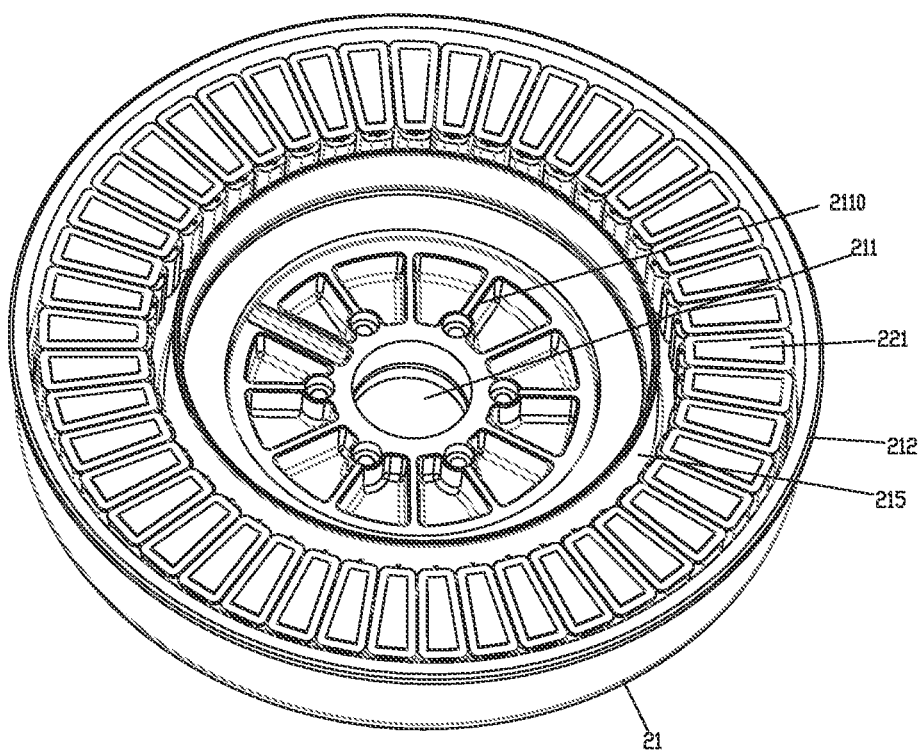
FIG. 5 is a schematic diagram of the stator assembly structure of the present invention.
Figure 6:
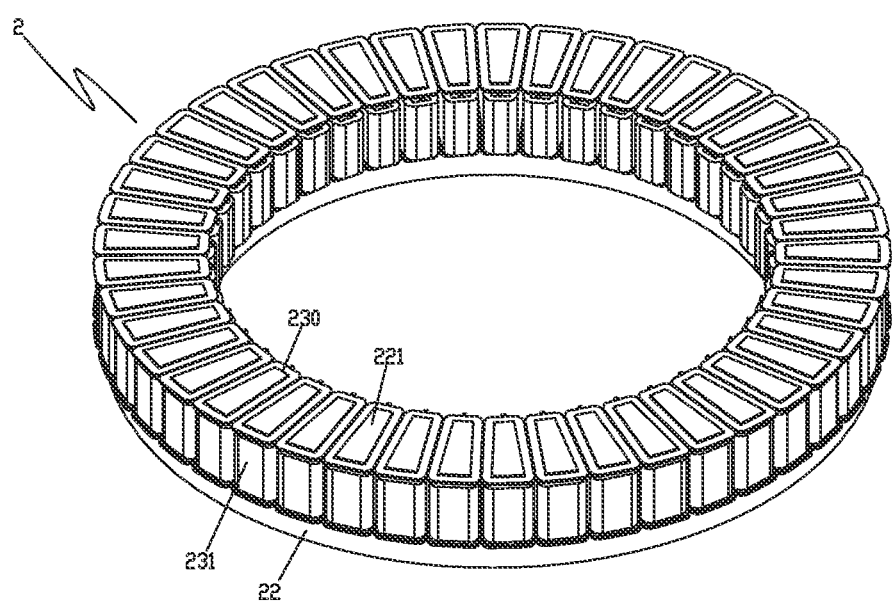
FIG. 6 is a three-dimensional schematic diagram of the coil winding assembly connected to the stator ring of the present invention.
Figure 7:
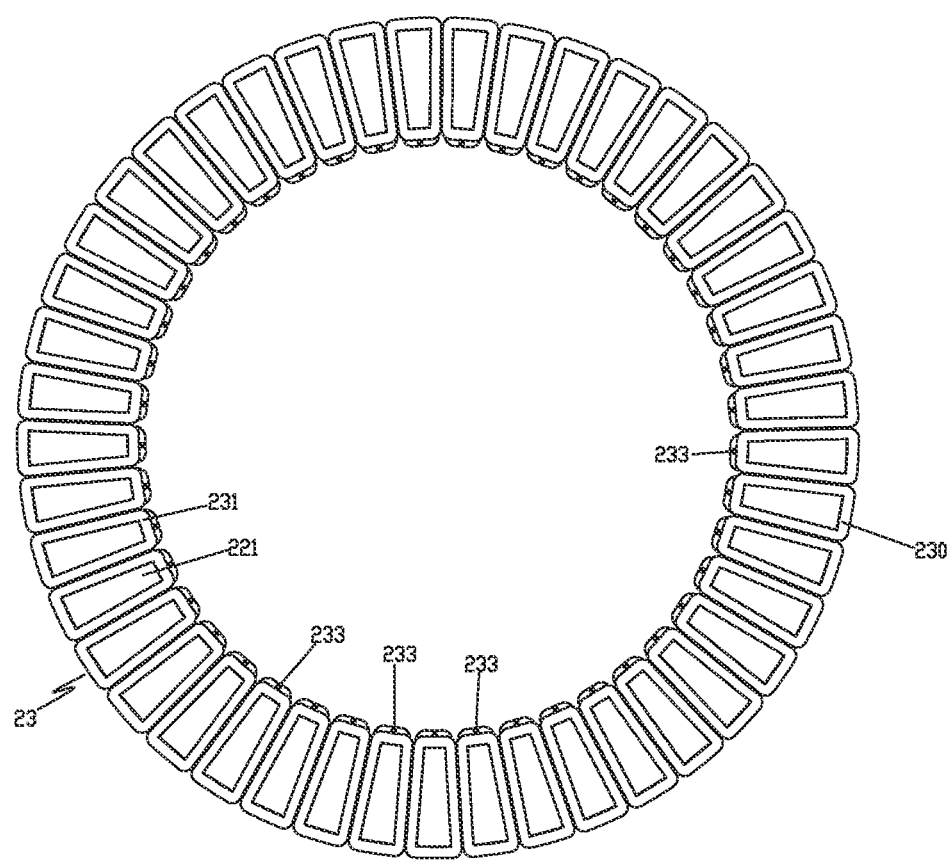
FIG. 7 is a top view of the coil winding assembly connected to the stator ring of the present invention.
Figure 8:
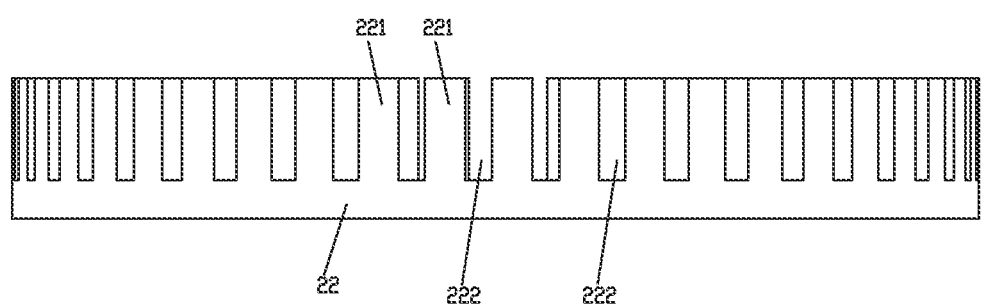
FIG. 8 is a side view of the stator ring of the present invention.

As shown in FIGS. 5-6, to facilitate assembly of the prefabricated coil winding assemblies, the stator winding column has an inner circular sidewall 2211, a first vertical sidewall 2212, an outer circular sidewall 2213, and a second vertical sidewall 2214, wherein each stator holding slot is formed between the first vertical sidewall 2212 of the stator winding column and the second vertical sidewall 2214 adjacent to the stator winding column 221. Accordingly, the cross-sectional shape of the coil hole 232 is the same as the cross-sectional shape of the stator winding column to facilitate the tight connection between the prefabricated coil winding assembly and the stator winding column, and the coil winding assembly is fixedly attached to the stator winding column by an adhesive when installation to make the connection more secure.

Figure 9:
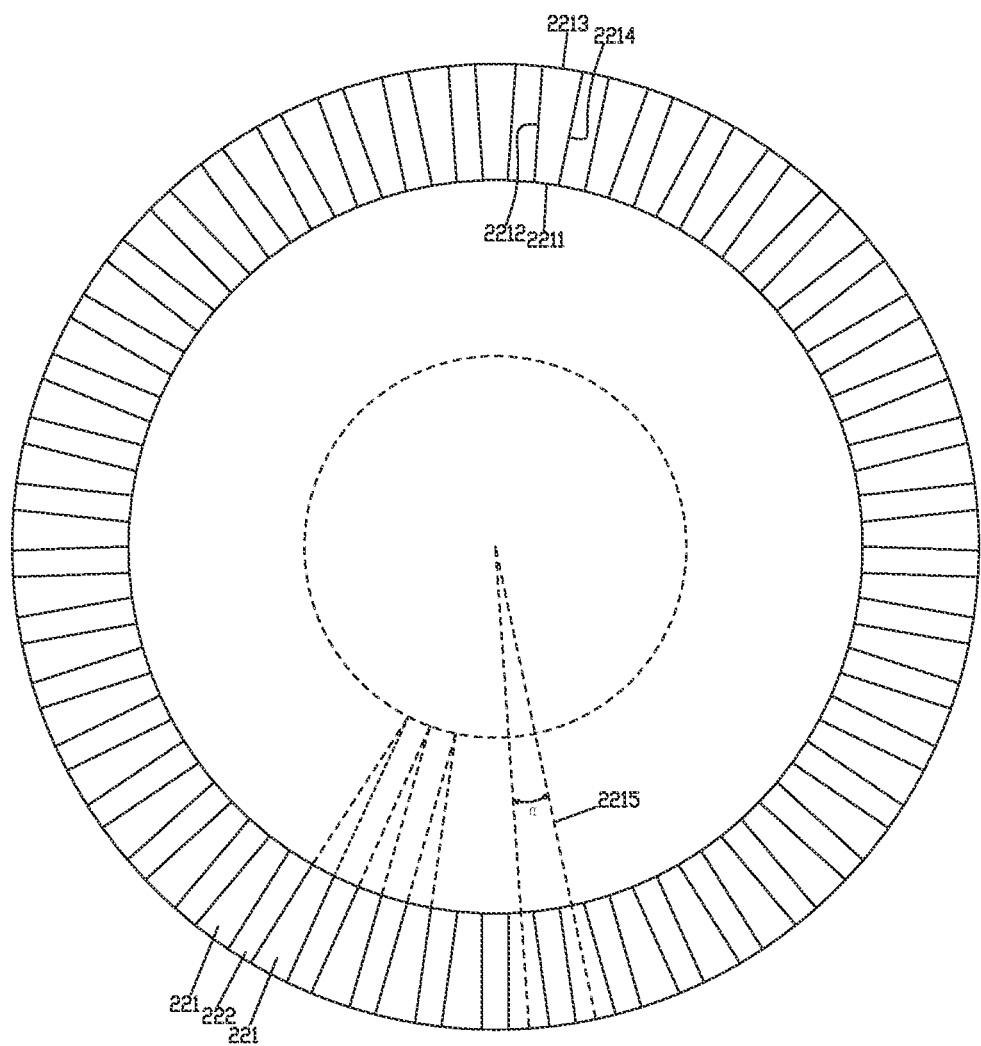
FIG. 9 is a top view of the stator ring of the present invention.

As shown in FIG. 9, the center line 2215 of the cross-section of the stator winding column passes through the center of the stator ring 22, and the first vertical sidewall 2212 and the second vertical sidewall 2214 of each stator winding column extend into the stator ring 22 and intersect on a vertical line parallel to the center axis of the stator ring 22, and all of the vertical lines are on a cylindrical surface concentric with the stator ring 22 to ensure a stable and balanced force structure.

By reasonably designing the number of stator winding columns and coil winding assemblies, the output power and torque of the axial flux magnet motor can be enhanced. If the angle between the center lines 2215 of two adjacent stator winding columns 221 is defined as $\alpha$, it can satisfy $3° \leq \alpha \leq 15°$. As a preferred solution of the present invention, $\alpha = 8°$, correspondingly, there are 52 stator winding columns and 52 sets of coil winding assemblies, with this number of stator winding columns and coil winding assemblies, it provides a good output torque and balance stability during operation.

Figure 4:
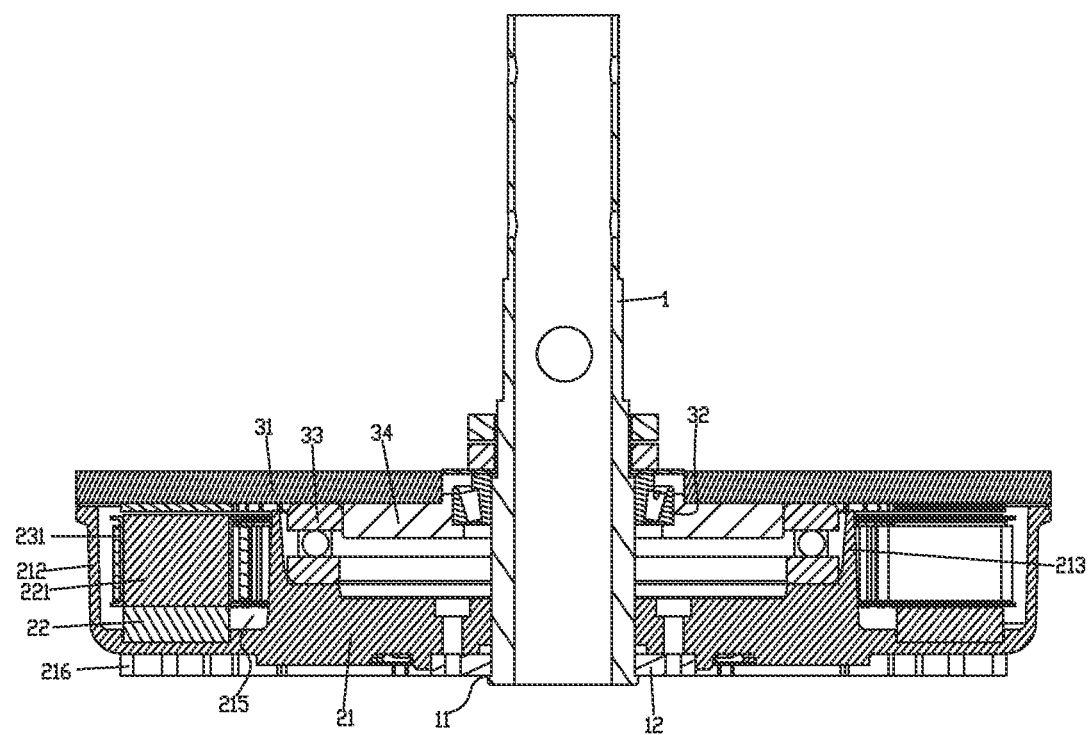
FIG. 4 is a sectional view of the axial flux magnet motor of the present invention.
Figure 18:
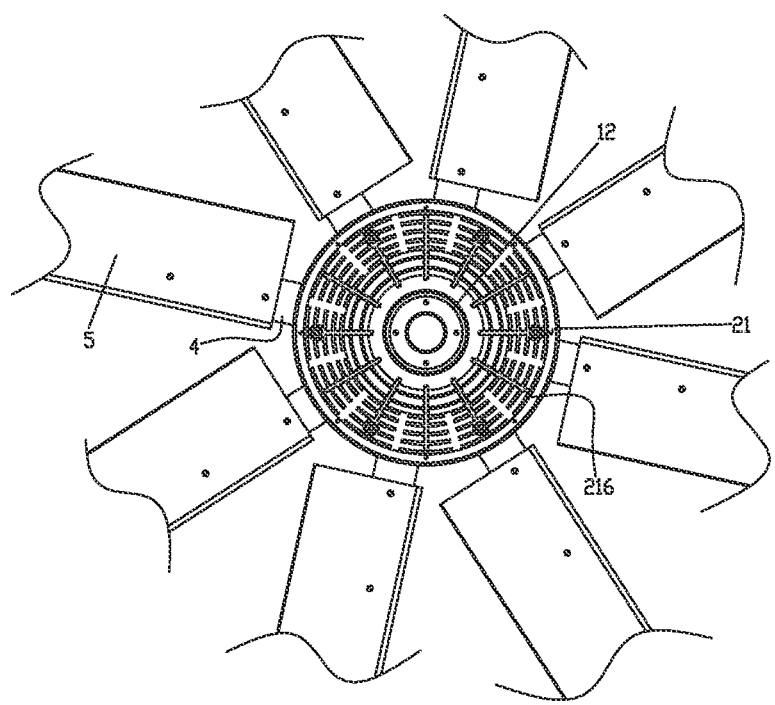
FIG. 18 is an elevation view of the ceiling fan of the present invention.

As shown in FIG. 4, the bottom of the stator ring 22 directly or indirectly contacts the inner bottom surface of the stator bottom cover 21 for heat conduction to better dissipate heat from the stator ring so as to avoid the high temperature of the stator assembly 2 during the operation of the axial flux magnet motor which may affect its service life. And to further improve the heat dissipation efficiency, as shown in FIG. 18, the outer bottom surface of the stator bottom cover 21 is provided with a plurality of bottom cover heat sinks 216, and the bottom cover heat sink 216 includes circumferential heat sink ribs disposed at the bottom position of the stator ring and spaced along the circumference of the stator bottom cover 21, and radial heat sink ribs disposed at the bottom position of the stator ring and spaced along the radial direction of the stator bottom cover, the circumferential heat sink rib is crossed with the radial heat sink rib.

As shown in FIG. 5, the stator bottom cover 21 includes a bottom cover outer ring 212 and a bottom cover inner ring 213 located on the inside of the bottom cover outer ring 212, a cover installation groove 214 is provided on the stator bottom cover 21 and formed between the bottom cover outer ring 212 and the bottom cover inner ring 213 for installing the stator ring 22, a bottom cover filling slot 215 is formed between the stator ring 22 and the bottom cover inner ring 213. During assembly, the terminals 233 of each coil winding assembly 23 are located in the bottom cover filling slot 215 on the inside of the stator ring 22, and after the terminals 233 are placed and connected, the bottom cover filling slot is filled with the adhesive, and when the adhesive is cured, the terminals of each coil winding assembly are then fixed, so that the reliable and stable electrical connection of the terminals can be ensured, the condition of bad contact can be avoided therefore, and the product quality can be ensured.

A method of assembling the stator assembly of the axial flux motor used in the present invention described above, specifically comprising the steps of:

1. Prefabricating coil winding assembly, winding copper wires on the insulating sleeve 230 to form a coil winding assembly with terminals, the insulating sleeve on the one hand as a skeleton for winding, on the other hand as an insulation protection between the coil and the stator winding column, and as a function of the connection with the stator winding column, so that they can be closely connected and protect the copper wire from being scratched.
2. Assembling the coil winding assembly, fixing and sleeving the insulating sleeve on the coil winding assembly to the stator winding column by the adhesive, and the terminals of each coil winding assembly are located in the inside of the stator ring; through the insulating sleeve, it can ensure the reliable connection and avoid the problem of scratching the copper wire.
3. Assembling the stator bottom cover, fixedly connecting the stator ring sleeved with the coil winding assembly to the relatively bottom cover installation slot, and making the bottom of the stator ring directly or indirectly contact the bottom surface of the bottom cover installation slot for heat dissipation, in addition, placing the terminals of each coil winding assembly in the bottom cover filling slot.
4. Connecting the terminals, sequentially connecting the terminals of each coil winding assembly and connecting them to the input power terminals accordingly.
5. Fixing the terminals 233, filling the bottom cover filling slot 215 with the adhesive to fix the terminals 233 and the input power terminals.

In this method, the coil winding assemblies are prefabricated and then assembled to the stator winding columns without the need to directly wind them on the stator ring, which can improve the production efficiency, and the key is to minimize the gap between two adjacent coil winding assemblies so as to maximize the number of coils on each stator winding column, and the finished connected terminals are cured with the adhesive in the bottom cover filling slot which ensures the reliable and stable electrical connection of each coil winding assembly.

As shown in FIGS. 1-19, a ceiling fan of the present invention uses the above-mentioned axial flux magnet motor stator assembly including a stator shaft 1 relatively and fixedly connected to the stator assembly 2, a rotor assembly 3 disposed above the stator assembly 2 and rotatable relative to the stator shaft 1, and a plurality of fan blades 5 circumferentially distributed on the rotor assembly 3. Each fan blade 5 is connected to the rotor assembly 3 through the fan blade connector 4, and the fan blade connector 4 has a connecting part and an inserting part, the connecting part being fixedly connected to the rotor assembly 3, and the inserting part extending into the fan blade 5 and being fixedly connected to the fan blade 5. In the present invention, the ceiling fan uses the axial flux magnet motor to drive the fan blade to rotate, which has the characteristics of high rotational efficiency, smooth operation, and safety; the inserting part of the fan blade connector is extended into the fan blade and relatively fixedly connected to the fan blade, so the connection is stable and reliable, which can avoid the problem of fatigue damage to the fan blade caused by the fan blade connector directly connected to the surface of the fan blade in the prior art.

Figure 3:
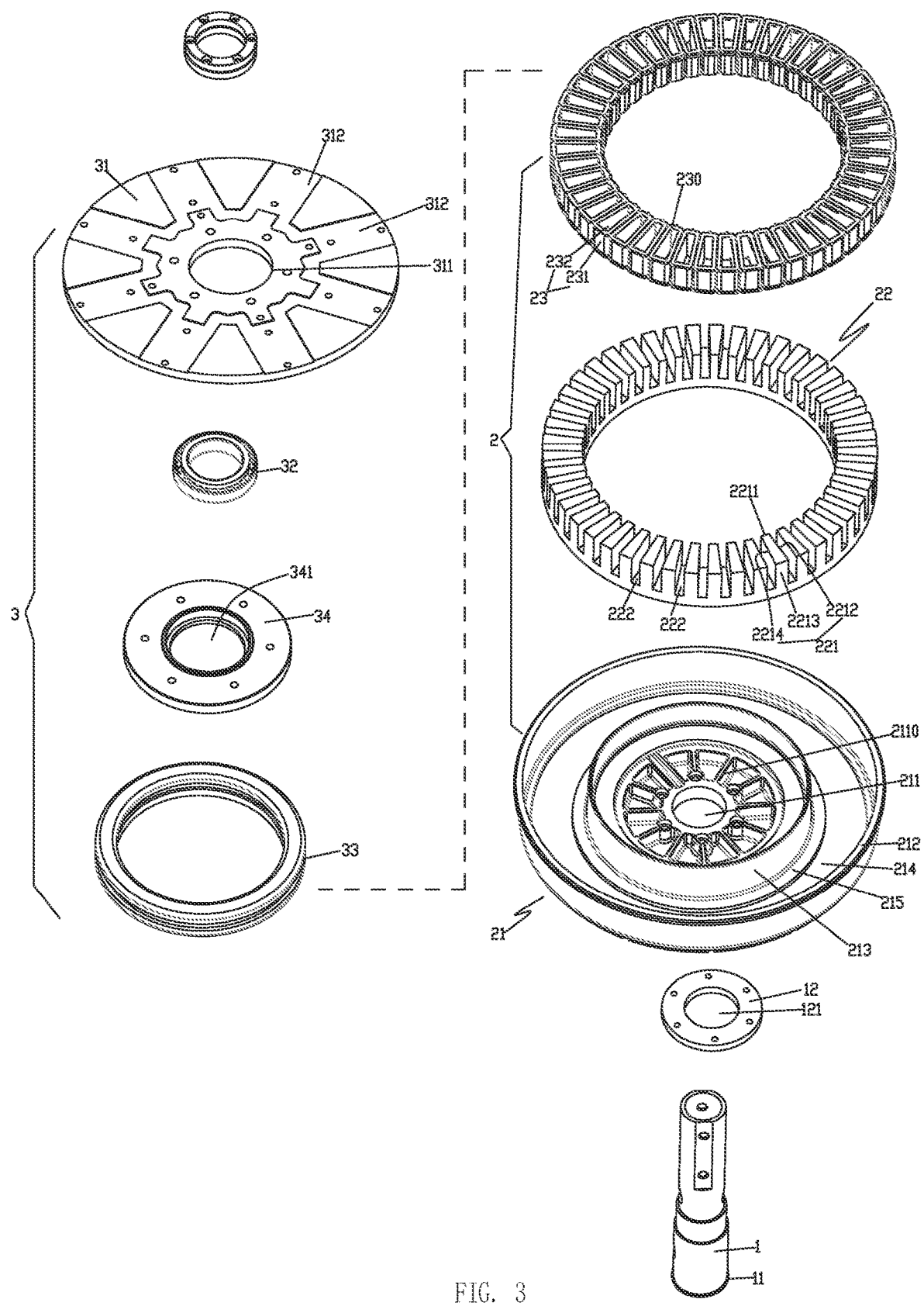
FIG. 3 is an exploded view of the axial flux magnet motor of the present invention.

As shown in FIGS. 3 and 4, the bottom wall of the stator bottom cover 21 is provided with a bottom cover hole 211 for connection with the stator shaft 1, the bottom cover hole 211 is located on the inner side of the bottom cover inner ring 213, and the lower end of the stator shaft 1 has a stator shaft shoulder 11 integrally formed therewith. When the stator assembly 2 is connected to the stator shaft 1 through the bottom cover hole 211, the inner side of the stator shaft shoulder 11 abuts against the outer side of the bottom cover hole 211 to support and limit the stator assembly through the stator shaft shoulder 11, which can effectively prevent the stator assembly from moving downwardly relative to the stator shaft and make the connection more stable and reliable.

In order to improve the structural strength of the stator bottom cover, the stator bottom cover 21 is provided with bottom cover reinforcing ribs 2110 extending radially along the circumference of the bottom cover hole 211.

In order to make the stator bottom cover firmly connected to the stator shaft to prevent the stator bottom cover 21 from rotating relative to the stator shaft 1, as an embodiment, the bottom cover hole 211 is fixedly connected to the stator shaft 1 by an interference fit.

As shown in FIG. 4, a stator flange cover 12 is attached to the lower end of the stator shaft 1 and above the stator shaft shoulder 11, the stator flange cover 12 is detachably fixedly connected to the stator shaft 1, such as a keyway connection, to limit the rotation of the stator flange cover 12 relatives to the stator shaft 1, the stator flange cover 12 is provided with a flange hole 121 for fixedly connecting to the stator bottom cover 21, and the outer side of the stator bottom cover 21 is formed with a bottom cover holding chamber for holding the stator flange cover 12. When assembled, the inner side of the stator shaft shoulder 11 abuts against the outer side of the flange hole 121, and the upper side of the stator flange cover 12 abuts against the outer side of the bottom cover hole 211. With this structure, the stator shaft and the stator flange cover can be manufactured separately according to the corresponding blank material, which can effectively save the manufacturing costs.

As shown in FIGS. 1-4, the rotor assembly 3 includes a rotor disk 31 disposed above the stator assembly 2, the rotor disk 31 is provided with a rotor hole 311 connected to the stator shaft 1 for rotation, a rotor rotating member 32 is connected between the rotor disk 31 and the stator shaft 1, and a support rotation assembly 33 is provided between the rotor disk 31 and the stator shaft 1 or between the rotor disk 31 and the stator assembly 2 for supporting the rotor disk 31 to rotate smoothly relative to the stator shaft 1. By the support rotation assembly, the rotor disk can rotate more smoothly and steadily relative to the stator shaft.

As shown in FIG. 4, the rotor rotating member 32 is a first thrust bearing which is disposed between the rotor hole 311 and the stator shaft 1, and can withstand the axial force, the inner ring of the first thrust bearing is fixedly connected to the stator shaft 1, and the outer ring of the first thrust bearing is directly or indirectly fixedly connected to the inner wall of the rotor hole 311, thereby utilizing the gravity of the rotor disk itself and the force characteristics of the first thrust bearing to make the rotor disk run smoothly with balanced force during rotation.

As shown in FIGS. 3-4, the support rotation assembly 33 is a plane bearing disposed between the rotor disk 31 and the stator assembly 2, a lower support ring of the plane bearing is relatively and fixedly connected to the stator assembly 2, and an upper support ring of the plane bearing abuts against the lower surface of the rotor disk 31. As shown in FIG. 4, the stator bottom cover 21 is provided with a supporting connector 34, and a supporting connector hole 341 is provided on the supporting connector 34, the supporting connector hole 341 is fixedly connected to the outer ring of the first thrust bearing, and the outer wall of the supporting connector 34 is fixedly connected to the inner wall of the upper support ring of the plane bearing, wherein the upper surface of the supporting connector 34 abuts against the lower surface of the rotor disk 31, and the plane bearing is mounted on the stator bottom cover 21 and located in the inner side of the bottom cover inner ring 213 so as to better support the rotor disk 31, improve the balance performance of the rotor disk rotation, and make the rotor disk rotate more smoothly.

Figure 19:
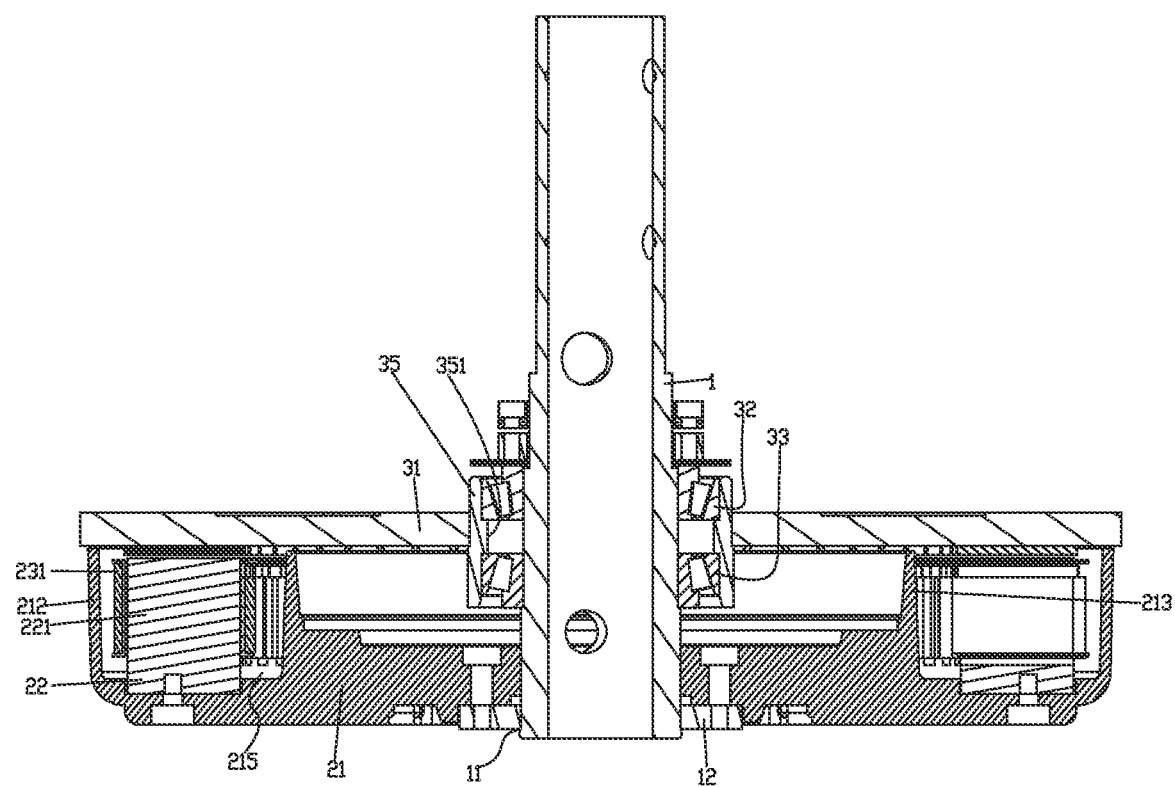
FIG. 19 is a cross-sectional view of another embodiment of the axial flux magnet motor of the present invention.

As another embodiment of the support rotation assembly 33, as shown in FIG. 19, the support rotation assembly 33 includes a second thrust bearing opposed to the first thrust bearing which is disposed between the rotor disk 31 and the stator shaft 1, and can withstand axial forces, the first thrust bearing and the second thrust bearing are connected to the rotor disk 31 by a sleeve 35 having an inner convex ring 351 which separates the first thrust bearing and the second thrust bearing so that the axial forces generated can be counteracted by the force opposing structure of the first thrust bearing and the second thrust bearing to make the rotor disk rotate more smoothly.

Figure 2:
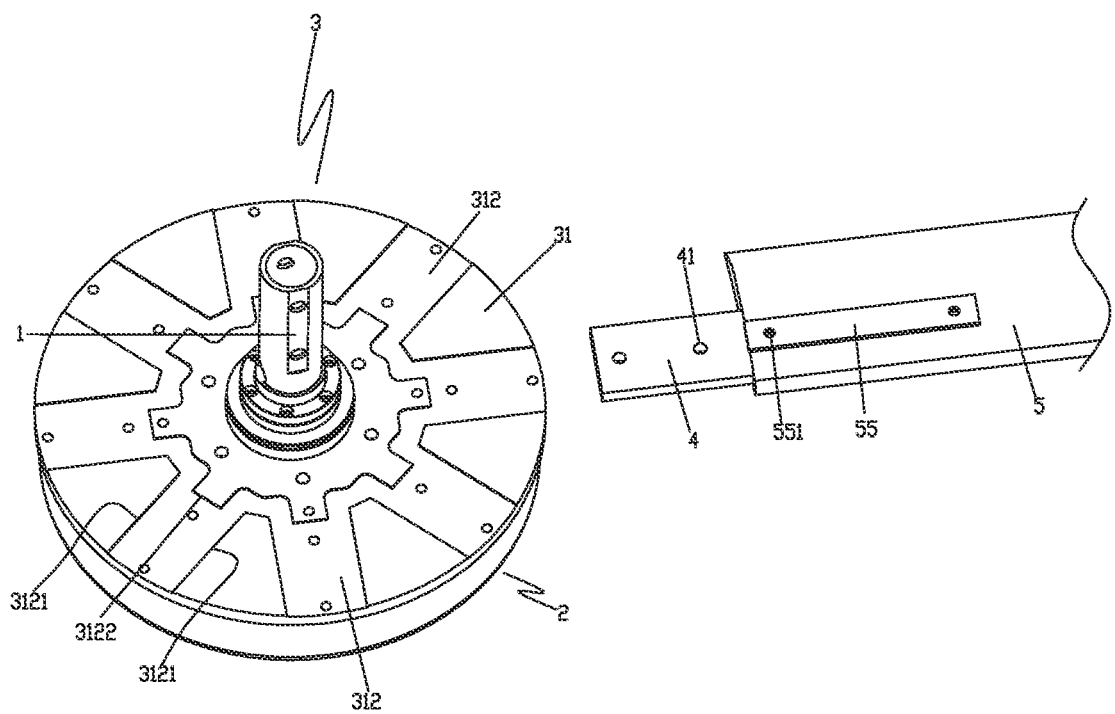
FIG. 2 is an exploded view of the axial flux magnet motor and fan blade of the present invention.

As shown in FIG. 2, the upper surface of the rotor disk 31 is provided with a plurality of installing and positioning grooves 312 at intervals along the circumferential direction, and the installing and positioning groove 312 is provided with an installation hole and a positioning convex 3122, during assembly, the inner end of the connecting part of the fan blade connector 4 reaches against the positioning convex, and a positioning sidewall 3121 on both sides of the installing and positioning groove 312 positions both sides of the fan blade connector 4 for a quickly positioning and installation.

As shown in FIGS. 10-17, the fan blade 5 has a hollow structure and is formed in one piece from aluminum to reduce the weight of the fan blade and its inertia; the fan blade 5 is provided with a left connecting inner rib 51 and a right connecting inner rib 52 at intervals between its upper inner wall and its lower inner wall, the left connecting inner rib 51 and the right connecting inner rib 52 are provided with a left limiting slot 511 and a right limiting slot 521 in opposite directions, respectively, and a positioning space 53 is formed between the left limiting slot 511 and the right limiting slot 521 for inserting and positioning the inserting part of the fan blade connector 4; on the fan blade 5, a fan blade installation hole 531 is also provided correspondingly on the positioning space 53; the fan blade connector 4 is provided with a connector installation hole 42, and the connecting part of the fan blade connector 4 is also provided with a connector hole 41 for connection with the rotor assembly 3; the fan blade installation hole 531 and the connector installation hole 42 are pierced with bolt or rivet to connect the fan blade connector 4 to the fan blade 5 so that the positioning space on the fan blade is fixed by interposing the connecting part of the fan blade connector, and the design structure is used to reduce the weight of the fan blade itself and improve the connecting strength between the fan blade and the rotor disk so that it can operate safely and smoothly.

Further, the upper and lower inner walls of the fan blade 5 are provided with a reinforcing inner rib 54 extending into the positioning space 53, and the fan blade installation hole 531 is located at the position of the reinforcing inner rib 54, so that when the inserting part of the fan blade connector 4 is inserted into the positioning space 53, the reinforcing inner rib 54 located in the positioning space 53 is joined against the inserting part of the fan blade connector 4 to limit the displacement of the fan blade connector 4 on that side and also improve the structural strength of the fan blade.

Figure 10:
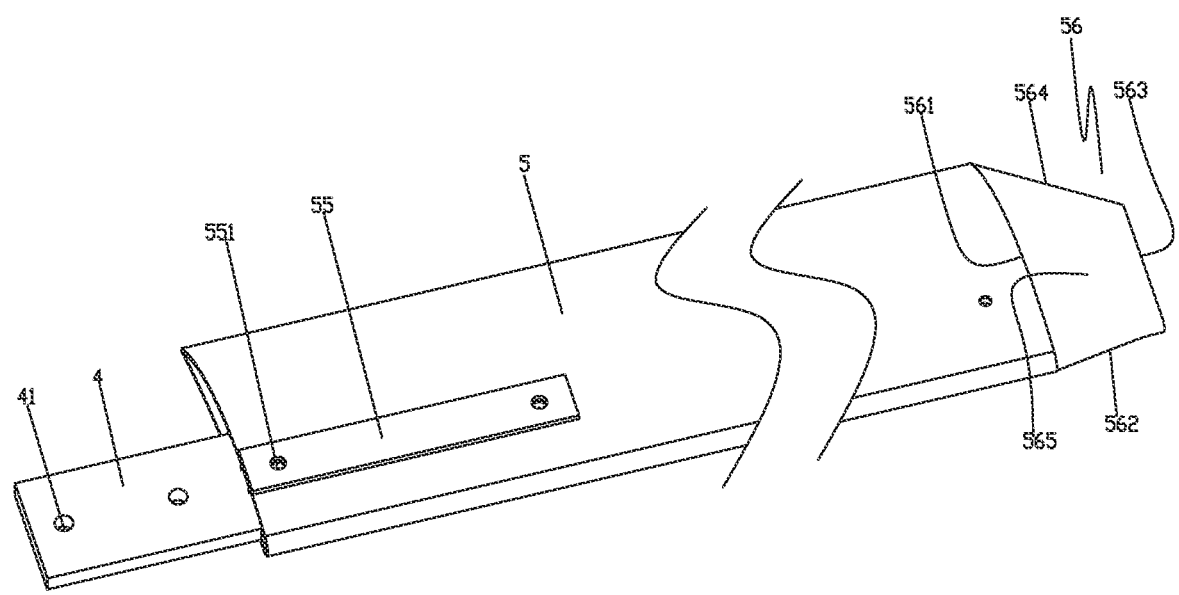
FIG. 10 is a schematic diagram of the three-dimensional structure of the fan blade of the present invention.
Figure 11:
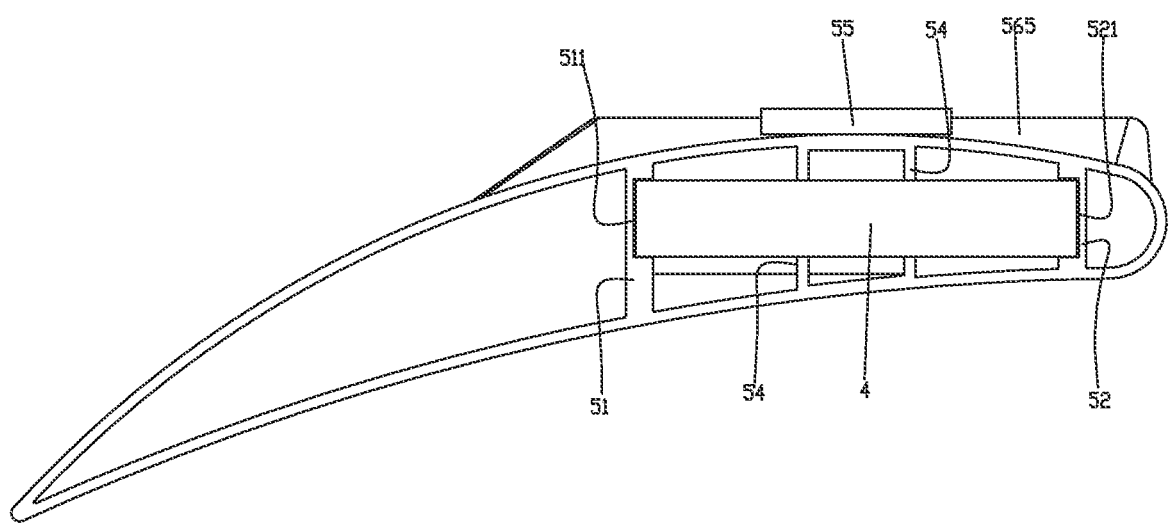
FIG. 11 is a side view of the fan blade of the present invention.
Figure 12:
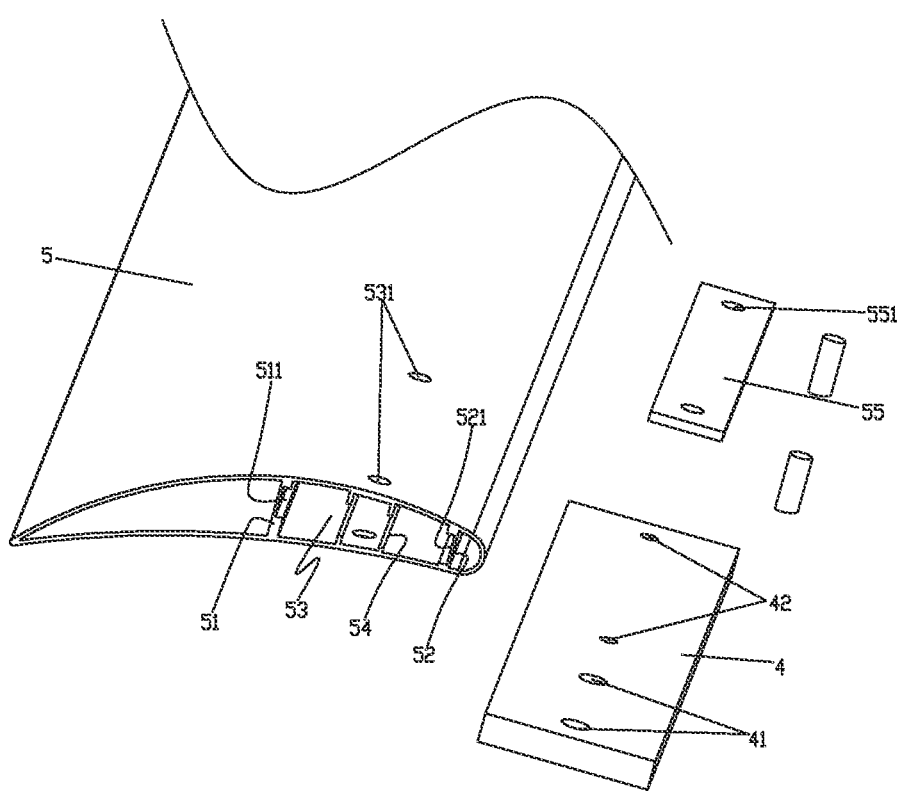
FIG. 12 is the first schematic diagram of the decomposed structure of the fan blade and the fan blade connector of the present invention.

As shown in FIG. 10, in order to improve the connection strength of the fan blade connector and the fan blade, the fan blade 5 is provided with a fan blade pad 55, and the fan blade pad 55 is provided with a pad installation hole 551 aligned with the fan blade installation hole 531 for connection, and when assembled, the fan blade pad 55 is installed on the outer surface of the fan blade 5.

As shown in FIGS. 10-17, the fan blade 5 is provided with a spoiler 56 at the tail end of the fan blade 5, the spoiler 56 has a connecting end face 561 that can be connected to the end of the fan blade 5, a tail end face 563 opposite the connecting end face 561, a front end face 562 located between the front end of the connecting end face 561 and the front end of the tail end face 563, a rear end face 564 located between the connecting end face 561 and the tail end face 563, a spoiler upper surface 565, and a spoiler lower surface 566; characterized in that the rear end face 564 is curved upward from the connecting end face 561 toward the tail end face 563, the spoiler upper surface 565 and the spoiler lower surface 566 are curved upward from the connecting end face 561 toward the tail end face 563, the spoiler lower surface 566 is set at an angle to the direction of rotation of the fan blade 5, and the area of the rear end face 564 gradually increases from the connecting end face 561 toward the tail end face 563. When the fan blade is in operation, the spoiler can effectively cut off the vortex generated at the end of the fan blade and make the fan blade operate smoothly; when the fan blade is in operation, the lower surface of the fan blade and the lower surface of the spoiler are acted upon by the airflow and have an upward force, since the spoiler upper surface is bent upward from the connecting end face toward the tail end face direction, it can make the spoiler upper surface better contact with the airflow and make the spoiler have a downward force, and both forces are counteracted. Thus, the vibration of the fan blade in the rotation process can be reduced and ensure the rotation of the fan blade smoothly; in addition, since the spoiler lower surface is bent upward from the connecting end face toward the tail end face direction, the airflow passing through the spoiler lower surface can be spread to a larger area in the radial direction of the fan blade, the airflow can be accelerated, and the optimized ventilation effect can be achieved.

Figure 13:
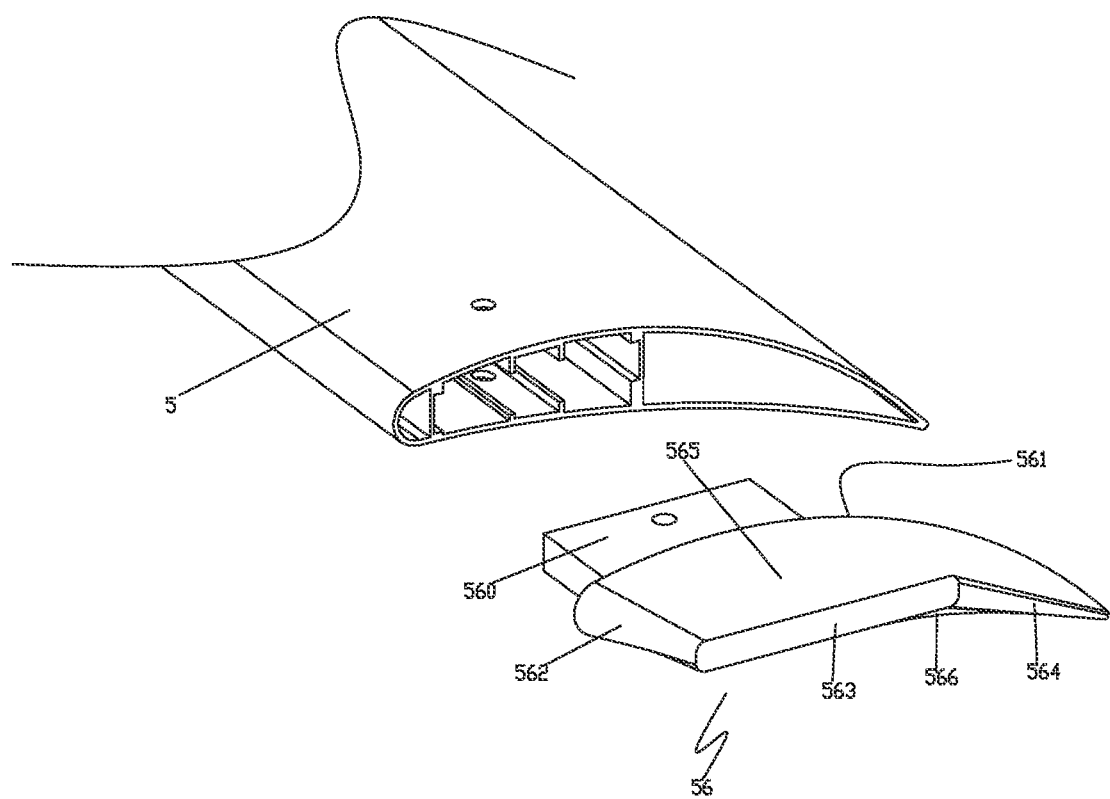
FIG. 13 is the second schematic diagram of the decomposed structure of the fan blade and the fan blade connector of the present invention.
Figure 14:
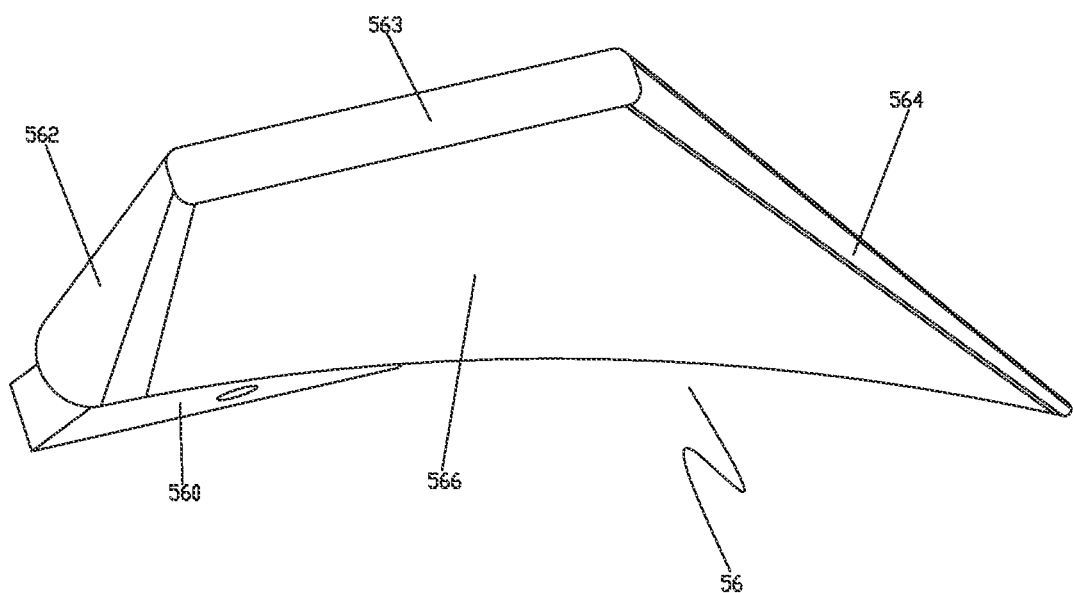
FIG. 14 is a schematic diagram of the three-dimensional structure of the spoiler of the present invention.
Figure 15:
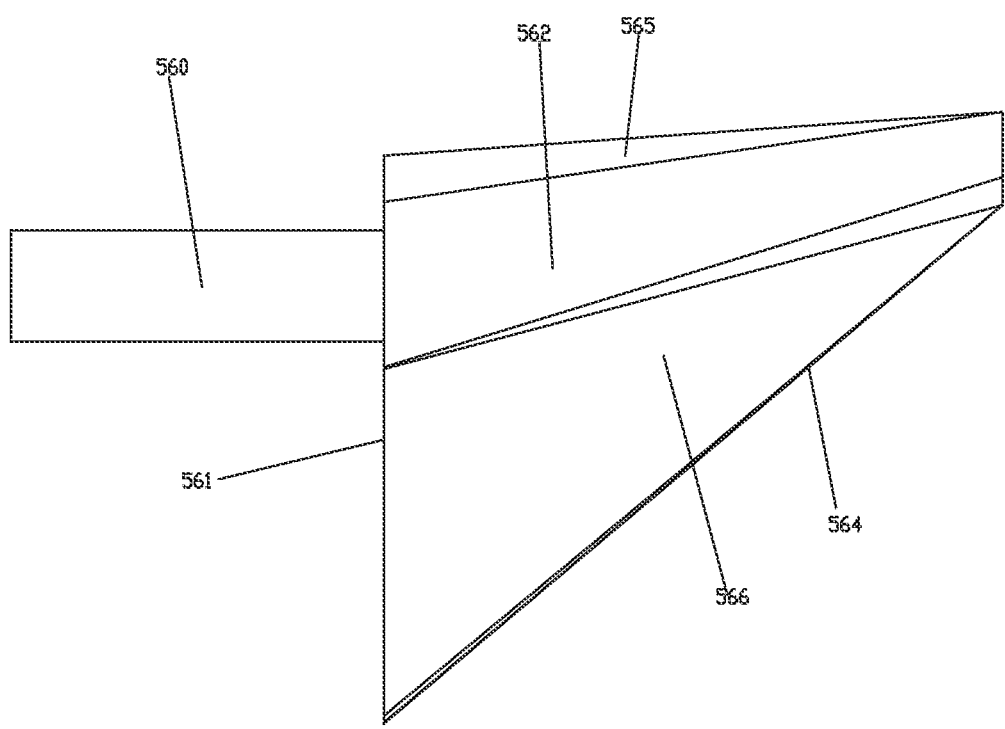
FIG. 15 is a side view of the spoiler of the present invention.
Figure 16:
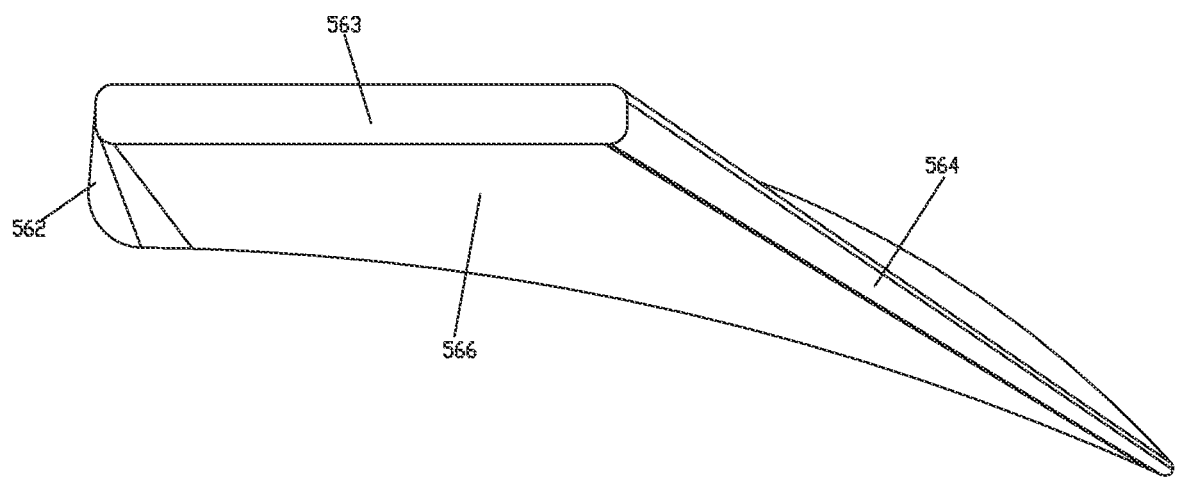
FIG. 16 is a schematic diagram of the spoiler structure of the present invention when viewed from the direction of its tail.
Figure 17:
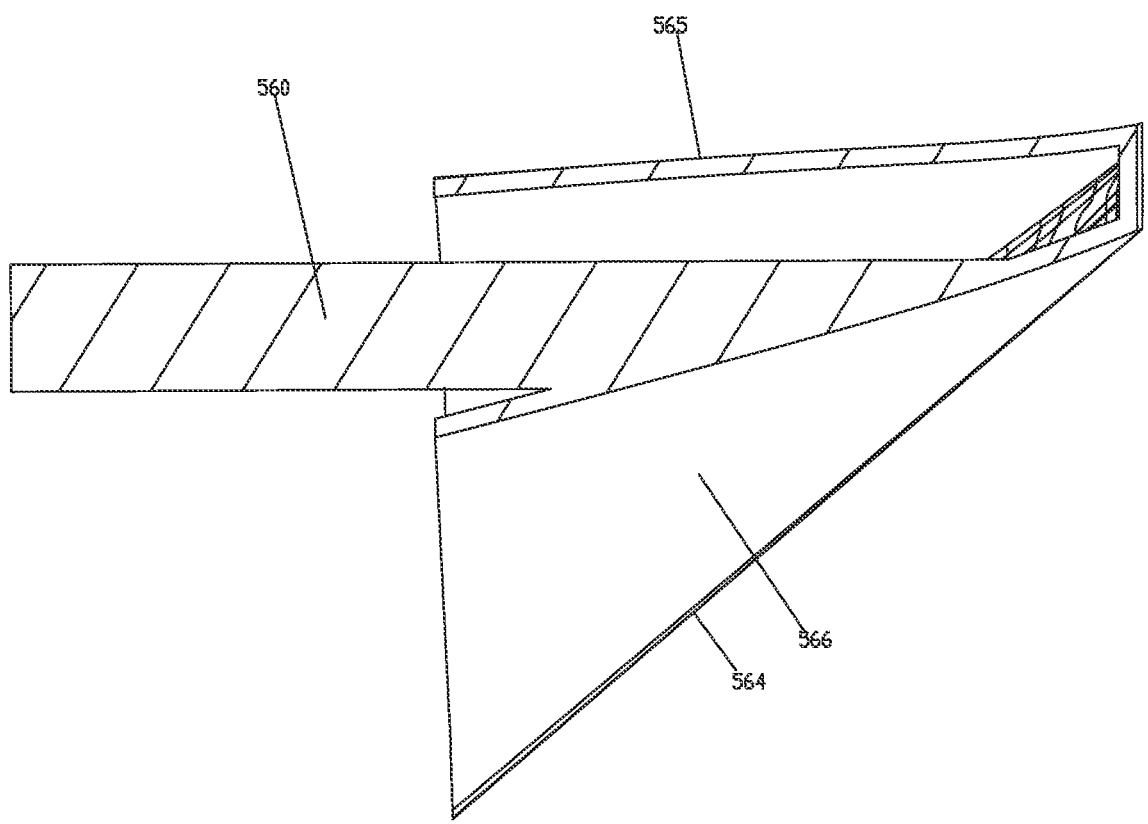
FIG. 17 is a sectional view of the spoiler of the present invention.

As shown in FIG. 13, the spoiler 56 is inserted into the tail end of the fan blade 5 by an inserting part 560, and the inserting part 560 and the fan blade 5 are fixedly connected by fasteners. As for the connection structure between the inserting part 560 and the fan blade 5, it is the same as the connection structure between the fan blade connector 4 and the fan blade 4.

What is claimed is:

1. An axial flux magnet motor stator assembly comprising:
    a stator ring in the shape of a circle, the stator ring having at least two stator winding columns extending in the axial direction uniformly in the circumferential direction,
    a stator bottom cover with a coil winding assembly connected to the stator ring with a plurality of terminals, the coil winding assembly includes a coil body and a coil hole provided on the coil body, and the coil winding assembly is connected to one of the stator winding columns through a coil holding slot; and
    a stator holding slot formed between two adjacent stator winding columns, the stator holding slot being provided with openings on both sides in the radial direction;
    wherein a bottom of the stator ring directly or indirectly contacts an inner bottom surface of the stator bottom cover, the stator bottom cover includes a bottom cover outer ring and a bottom cover inner ring located on an inner side of the bottom cover outer ring, a bottom cover installation groove is formed between the bottom cover outer ring and the bottom cover inner ring for installing the stator ring, and a plurality of bottom cover filling slots are formed between the stator ring and the bottom cover inner ring, and
    wherein each of the the terminals are located in at least one of the bottom cover filling slots and fixed by an adhesive.

2. The axial flux magnet motor stator assembly according to claim 1, wherein a center line of a cross-section of each of the stator winding columns passes through a center of the stator ring, each stator winding column has a first vertical sidewall and a second vertical sidewall, the first vertical sidewall and the second vertical sidewall extend into the stator ring and intersect on a vertical line parallel to a center axis of the stator ring, and all of the vertical lines of the at least two stator winding columns are on a cylindrical surface concentric with the stator ring.

3. A method for assembling the axial flux magnet motor stator assembly for use in claim 1, comprises comprising the steps of:
    (a) prefabricating the coil winding assembly by winding copper wires on an insulating sleeve;
    (b) fixing and sleeving the coil winding assembly to the stator winding column by the adhesive, and the terminals of each coil winding assembly are located inside the stator ring;
    (c) fixedly connecting the stator ring with the coil winding assembly to the bottom cover installation groove, and making the bottom of the stator ring directly or indirectly contact the bottom of the bottom cover installation groove, and placing each of the terminals of each coil winding assembly in a respective one of the bottom cover filling slots;
    (d) sequentially connecting the terminals of each coil winding assembly and connecting each of them to a respective input power terminal of a plurality of power terminals; and
    (e) fixing the terminals and the input power terminals by filling the bottom cover filling slot with the adhesive.

4. A ceiling fan using the axial flux magnet motor stator assembly of claim 1, further comprising:
    a stator shaft relatively and fixedly connected to the axial flux magnet motor stator assembly;
    a rotor assembly disposed above the stator assembly and rotatable relative to the stator shaft; and
    a plurality of fan blades circumferentially distributed on the rotor assembly.

5. The ceiling fan according to claim 4, wherein each fan blade is connected to the rotor assembly through a fan blade connector, and the fan blade connector has a connecting part being fixedly connected to the rotor assembly and an inserting part extending into the respective fan blade and being fixedly connected to the respective fan blade.

6. The ceiling fan according to claim 5, further comprising:
    a rotor disk disposed above the stator assembly;
    a rotor rotating member connected between the rotor disk and the stator shaft; and
    a support rotation assembly provided between the rotor disk and the stator shaft or between the rotor disk and the stator assembly for supporting the rotor disk to rotate smoothly relative to the stator shaft;
    wherein an upper surface of the rotor disk is provided with a first groove having a positioning convex, the connecting part of the fan blade connector is connected to the rotor assembly by positioning the positioning convex and the first groove.

7. The ceiling fan according to claim 5, wherein each of the fan blades is a hollow structure, one end of each of the fan blades is provided with an upper inner wall, a lower inner wall, a left connecting inner rib and a right connecting inner rib at intervals between the upper inner wall and the lower inner wall, the left connecting inner rib and right connecting inner rib are provided with a left limiting slot and a right limiting slot in opposite directions, respectively, and a positioning space is formed between the left limiting slot and the right limiting slot, the connecting part of the respective fan blade connector is fixedly connected to the respective fan blade by being inserted into the positioning space.

8. The ceiling fan according to claim 4, wherein a bottom wall of the stator bottom cover is provided with a bottom cover hole for connection with the stator shaft, and a lower end of the stator shaft has a stator shaft shoulder integrally formed therewith to prevent the axial flux magnet motor stator assembly from moving downwardly relative to the stator shaft.

9. The ceiling fan according to claim 4, further comprising:
    a rotor disk disposed above the stator assembly;
    a rotor rotating member connected between the rotor disk and the stator shaft; and
    a support rotation assembly provided between the rotor disk and the stator shaft or between the rotor disk and the stator assembly for supporting the rotor disk to rotate smoothly relative to the stator shaft.

10. The ceiling fan according to claim 9, wherein the rotor rotating member is a first thrust bearing that is disposed on the stator shaft and can withstand the axial force, an inner ring of the first thrust bearing is fixedly connected to the stator shaft, and an outer ring of the first thrust bearing is fixedly connected to the rotor disk.

11. The ceiling fan according to claim 10, wherein the support rotation assembly includes a second thrust bearing opposed to the first thrust bearing which is disposed between the rotor disk and the stator shaft and can withstand axial forces, the first thrust bearing and the second thrust bearing are connected to the rotor disk by a sleeve having an inner convex ring which separates the first thrust bearing and the second thrust bearing.

12. The ceiling fan according to claim 9, wherein the support rotation assembly is a plane bearing, a lower support ring of the plane bearing is relatively and fixedly connected to the stator assembly, and an upper support ring of the plane bearing abuts against a lower surface of the rotor disk.

13. The ceiling fan according to claim 12, wherein the upper support ring of the plane bearing is connected to the rotor rotating member on the stator shaft by a supporting connector, and an upper surface of the supporting connector abuts against the lower surface of the rotor disk.

\* \* \* \* \*